United States Patent
Love

(10) Patent No.: US 12,540,059 B2
(45) Date of Patent: Feb. 3, 2026

(54) CV CAMERA CABLE WRAP SENSOR

(71) Applicant: TAIT TOWERS MANUFACTURING, LLC, Lititz, PA (US)

(72) Inventor: James D. Love, Lititz, PA (US)

(73) Assignee: TAIT Global LLC, Lititz, PA (US)

( * ) Notice: Subject to any disclaimer, the term of this patent is extended or adjusted under 35 U.S.C. 154(b) by 544 days.

(21) Appl. No.: 18/084,026

(22) Filed: Dec. 19, 2022

(65) Prior Publication Data

US 2024/0199387 A1    Jun. 20, 2024

(51) Int. Cl.
*B66D 1/48* (2006.01)
*B66D 1/26* (2006.01)
*G05B 19/4155* (2006.01)
*G06T 7/00* (2017.01)

(52) U.S. Cl.
CPC ........... *B66D 1/485* (2013.01); *B66D 1/26* (2013.01); *G05B 19/4155* (2013.01); *G06T 7/0006* (2013.01); *G05B 2219/49253* (2013.01); *G06T 2207/30164* (2013.01)

(58) Field of Classification Search
CPC ....... B66C 23/88; B66C 23/90; B66C 23/905; B66C 13/18; B66C 13/16; B66C 13/04; B66C 13/10; B66C 13/105; B66C 13/15; B66C 13/06; B66C 13/065; B66D 1/54; B66D 1/485; B66D 1/26; B66D 3/18

See application file for complete search history.

(56) References Cited

U.S. PATENT DOCUMENTS

| | | | | |
|---|---|---|---|---|
| 4,570,875 | A * | 2/1986 | Buluschek | B65H 54/2875 242/478.2 |
| 4,928,904 | A * | 5/1990 | Watts | G01B 11/14 242/478.2 |
| 6,443,385 | B1 * | 9/2002 | Grandauer | B65H 54/2875 242/478.2 |
| 7,201,366 | B2 * | 4/2007 | Sanders | B66D 1/54 254/377 |
| 9,194,100 | B2 * | 11/2015 | Fix | E02F 9/268 |
| 10,538,408 | B2 * | 1/2020 | Mordeglia | B65H 54/2872 |
| 10,717,631 | B2 | 7/2020 | Rudy et al. | |
| 2016/0318740 | A1 * | 11/2016 | Kos | B66D 1/58 |
| 2022/0144606 | A1 * | 5/2022 | Abuhaikal | G05B 13/0275 |
| 2022/0185638 | A1 * | 6/2022 | Hausladen | B65H 54/2875 |
| 2022/0306434 | A1 * | 9/2022 | Ishida | B66C 13/48 |
| 2022/0364423 | A1 * | 11/2022 | Abuhaikal | B65H 75/4484 |

FOREIGN PATENT DOCUMENTS

| | | | | |
|---|---|---|---|---|
| CN | 104555768 A | * | 4/2015 | B66D 1/46 |
| CN | 107337100 A | * | 11/2017 | B66C 15/045 |
| CN | 107403443 A | * | 11/2017 | B66D 1/40 |
| CN | 108190774 A | * | 6/2018 | B66D 1/54 |

(Continued)

Primary Examiner — Anna M Momper
Assistant Examiner — Henrix Soto
(74) Attorney, Agent, or Firm — Saxton & Stump, LLC

(57) ABSTRACT

A computer vision camera sensor apparatus for motorized winches capable of monitoring multiple conditions relating to the cable and drum and a processing system capable of analyzing the camera sensor output to identify multiple conditions relating to the winch cable and drum and initiate appropriate control signals to the winch to protect the equipment and loads supported by the hoist.

14 Claims, 3 Drawing Sheets

(56) References Cited

FOREIGN PATENT DOCUMENTS

| CN | 111252673 | A | * | 6/2020 | ............. B66C 13/48 |
| CN | 111392626 | A | * | 7/2020 | ............... G01D 5/26 |
| CN | 111847294 | A | * | 10/2020 | ............... B66D 1/54 |
| CN | 112173971 | A | * | 1/2021 | ............. B66C 13/16 |
| CN | 112299273 | A | * | 2/2021 | ............. B66D 1/485 |
| CN | 113247812 | A | * | 8/2021 | ............... B66D 1/54 |
| DE | 102018117687 | A1 | * | 1/2020 | ........ B65H 54/2875 |
| JP | H01203174 | A | * | 8/1989 | |
| JP | 3268153 | B2 | * | 3/2002 | |
| WO | WO-2014047840 | A1 | * | 4/2014 | ............. B66D 1/485 |
| WO | WO-2022106758 | A1 | * | 5/2022 | ............... B66D 1/30 |
| WO | WO-2022118541 | A1 | * | 6/2022 | ............. B63B 21/16 |
| WO | WO-2022191005 | A1 | * | 9/2022 | ............... B66D 1/54 |

* cited by examiner

CV CAMERA CABLE WRAP SENSOR

FIELD OF THE INVENTION

The disclosure is generally related to winch operation and control. The application relates more specifically to an input sensor for monitoring cable wrap on a winch drum which can detect anomalies, initiate control instructions to the winch control system, and coordinate with a motion control system to minimize impact on the load movement being managed by the motion control system.

BACKGROUND OF THE INVENTION

Motion automation systems using multiple winches to suspend and animate flying movement of persons, objects, or equipment is well known. More recent innovations in such motion animation systems incorporate distributed control features to spread control processing computations among the on-board controls for individual motion elements to provide greater computational bandwidth at the motion automation system. Such motion automation systems frequently employ multiple winches to automate scenery and "fly" people. Cable wrapping and unwrapping anomalies cause disruptions in the movement of persons, objects, or equipment suspended by the motion animation system, damage equipment, and create dangerous conditions. Improper cable wrapping on the drum is best addressed by immediately stopping the winch and adjusting the cable wrap on the drum.

Current monitoring approaches for such winches require multiple separate sensors to monitor and confirm that the cable is correctly wrapping and loading on the drum. The speed at which winches are called to operate in many animated flying systems requires control and safety monitoring systems with the capability to detect and act quickly. Multiple sensor inputs are currently required to monitor slack line, cross or skipped groove and overtravel limits. A single input sensor capable of detecting and responding to all these conditions would improve control efficiency and speed. Advances in cameras and computer vision sensors make such devices sufficiently cost effective to implement to solve these problems when previously they were not.

What is needed is a single sensor apparatus for motorized winches capable of monitoring multiple conditions relating to the cable and drum and a processing system capable of analyzing the single sensor output to identify multiple conditions relating to the winch cable and drum and initiate appropriate control signals to the winch to protect the equipment that does not suffer from the drawbacks of the prior art. Additional benefits would be realized by a sensor and processing system capable of interfacing with motion controls systems that coordinate operation of multiple winches to minimize disruption to animation motion.

SUMMARY OF THE INVENTION

An aspect of an embodiment of the present disclosure includes a system for monitoring cable winding and unwinding on a winch drum comprising a computer vision sensor having a field of view in which the winch drum is positioned, the sensor generating an output signal representative of an image of the field of view, and a processing system configured to receive the computer vision sensor output signal, analyze and compare the image output signal to one or more image parameters indicative of one or more winch operation conditions, and initiate a winch operation output signal indicative of the one or more winch operational conditions, and a motion control system configured to receive the winch operation output signal from the processing system and initiate a motor control output signal responsive to the one or more winch operational conditions detected.

A further aspect of the present disclosure includes a system for monitoring cable winding and unwinding on a winch drum using a computer vision sensor wherein the computer vision output signal is analyzed and compared by the system to identify and initiate a winch output operation signal of one or more winch operation conditions, including a number of cable wraps on the drum, cross groove cable winding on the drum, skipped groove cable winding on the drum, and cable slack on the drum, and the systems initiates a winch operation output signal. The winch operation output signal is received by a motion control system which may initiate a motor stop signal to stop drum movement when the winch operation output signal indicates undesired conditions are present on the drum.

A further aspect of the present disclosure includes a system for monitoring cable winding and unwinding on a winch drum using a computer vision sensor providing input to a processing system from which the processing system determines the rate at which cable is being wound or unwound from the drum, amount of cable wound on the drum, or any conditions for which a stop signal is initiated, and communicates signals representative thereof to a motion control system which coordinates operation of multiple winches to coordinate movement of a load support within a three-dimensional working space.

A further aspect of the present disclosure includes a system for monitoring cable winding and unwinding on a winch drum using a computer vision sensor which is processed to detect and signal one or more adverse winch operational conditions in an abnormal winch drum to a motion control system, the motion control system managing operation of a plurality of winch drums to effect motion of a suspended load and, upon receipt of the adverse winch operational condition signal, initiate an output signal to the abnormal winch drum halting movement thereof and, if possible, adjusting operation of the normally operating winches in the plurality of winch drums to safely control the suspended load.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a winch drum monitoring system incorporating a computer vision sensor to observe cable on a winch drum and an generate image signal representative thereof which is used by a processing system and a motion control system to manage operations of the winch drum. What follows are exemplary embodiments.

Figure 1:
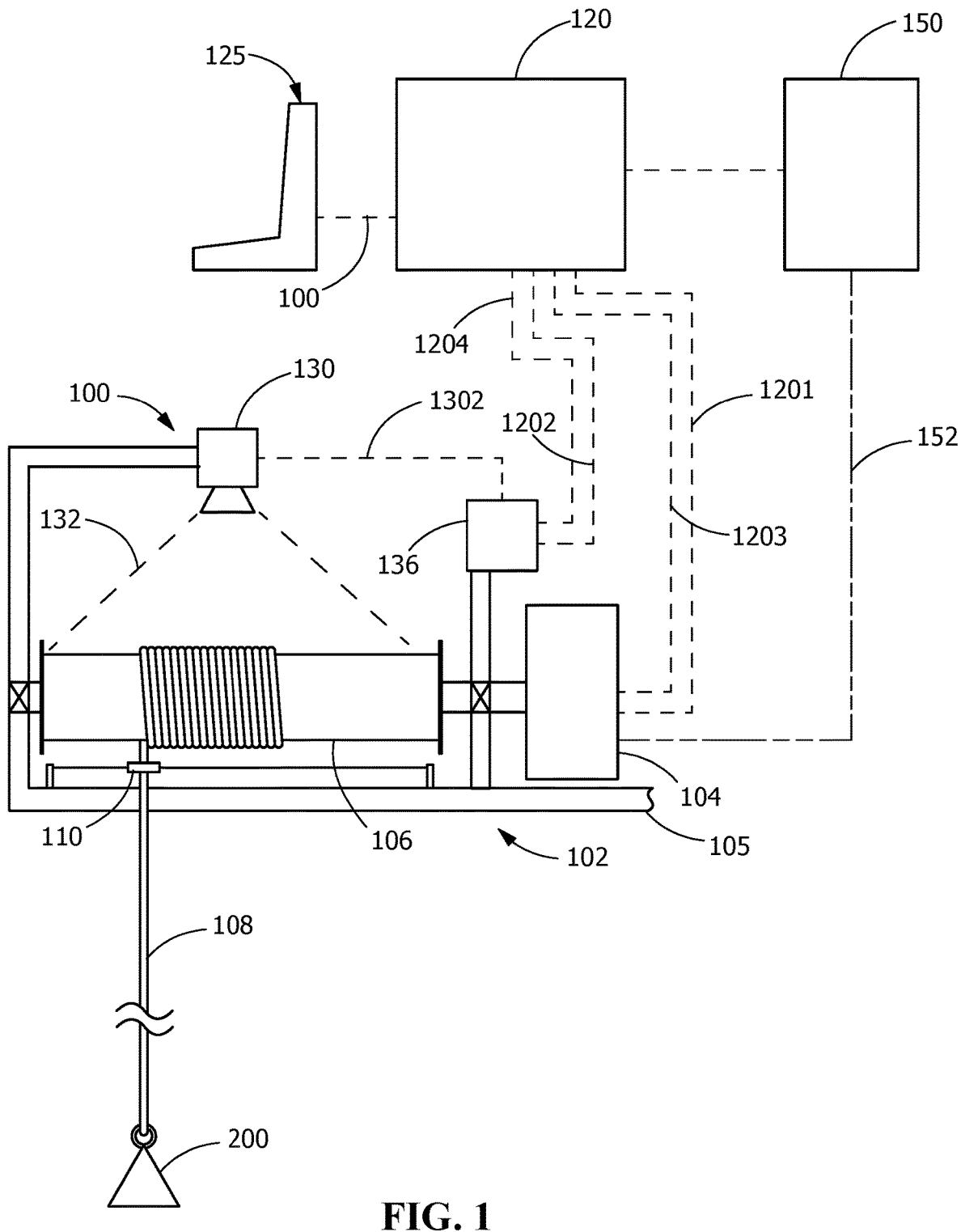
FIG. 1 is a diagram of a computer vision cable wrap sensor system embodying aspects of the present invention.

FIG. 1 depicts a computer vision camera cable wrap monitoring system for a winch drum 100 according to an exemplary embodiment of the disclosure. A winch assembly 102 includes a frame 105 supporting a driving motor 104 and a drum 106. The driving motor 104 which causes a drum 106 to rotate to spool or unspool at least one flexible cable 108 wrapped about drum 106. In one embodiment, cable 108 is, but not limited to, wire, wire rope, wire cable, filament, string, cord, rope, or combinations thereof. The drum surface may include helical grooves to guide cable during the initial layer wound onto the drum. The drum may be configured to pile on multiple cable layers enabling greater lengths of cable to be spooled onto smaller (shorter) drums. A moveable fairlead 110 may be provided to ensure that cable 108 spools and unspools onto or from drum 106 smoothly. The drum and fairlead may be configured to pile on multiple cable layers enabling greater lengths of cable to be spooled onto smaller (shorter) drums.

Retraction or retracting cable references drawing, spooling, winding, or pulling of cable 108 into a storage area of the hoist, e.g., winding the cable about a drum or reel to shorten or decrease the length of cable suspended by the hoist. Deployment or deploying of cable references releasing, unspooling, or unwinding of cable from a storage area, e.g., a drum or reel, to increase or extend the length of cable supported by the winch assembly. Motion of a supported load 200 is facilitated by deploying or retracting cable along a pull direction by controlled rotation the winch drum.

Operation of the driving motor 104 is managed by a motion control system 120. A power supply 150 provides power to the motor by a cable or bus 152. Motion control system may receive motor operating information 1201 via a motor input link from the driving motor such as direction and speed of rotation. The motion control system may also send motor inputs 1203 to motor 104 via a motor output link to manage operation of the motor.

A human-machine interface (HMI) 125, possibly utilizing a graphical user interface (GUI), may also be operably connected to the motion control system via two-way user interface link 1252 to enable an operator to interact with the motion control system 120. Fixed parameters related to winch apparatus 102 such as drum characteristics and cable length may be input to enable the motion control system to precisely control supported by the winch apparatus using algorithm computation(s) performed in the motion control system.

Computer vision is a field of computer science that trains computers and systems to interpret and understand the visual world. Computer vision allows computers and systems to derive meaningful information from visual inputs including, but not limited to, digital images and videos. The computers and systems react to the visual inputs they "see", for example by taking actions or making recommendations based on that information. The computer vision sensing arrangement simplifies installation: simply point the computer vision camera at the winch drum and use a computer vision/software algorithm to measure the cable on the drum and sense the un-desired or unexpected wrapping of cable on a cable drum.

Computer vision cameras convert the visual inputs they receive in the form of digital images and/or videos into data that can then be transferred to a computer or control system for processing. Processing by the control system compares the data to known data, whether initially input to the system or obtained through prior "observations" of the computer vision camera, and generates outputs indicative of operational parameters (e.g., changes with respect to time) or deviations from expected normal conditions.

Cable wrap monitoring system 100 further includes a computer vision camera 130 having a field of view 132. Computer vision camera 130 is positioned on frame 105 so that at least drum 106 and the cable wound thereon are situated within field of view 132. A camera output signal 1302 is from computer vision camera is communicated via camera output link to a processing system 136. Camera output signal 1302 is a digital signal representative of an image within the camera field of view. Processing system 136 receives the camera output signal and compares the data representative of the image within the field of view to one or more operational parameters to identify operational conditions of the cable wound on drum 106. Digital data may be stored in the processing system representative of one or more anticipated operational conditions that might occur on the winch drum.

Exemplar computer vision cameras may include Intel Real Sense Depth Cam D405, Model No. 82635DSD405 and Luxinos Oak-D, Model No. A00110-INTL. These computer vision cameras feature built-in image processing capability allow them to work with conventional small computer platforms, such as an AI Box Computer, Model No. EPC-R3720 by Advantach, or even an embedded computer processor incorporated in the motion controller. Numerous other hardware options with similar specifications are commercially available and may be utilized with equal effectiveness within the scope of this disclosed invention.

Processing system 136 comprises a control/processing board or device and includes one or more microprocessors and one or more memory devices. The microprocessor(s) of the control/processing board can execute one or more control programs or algorithms stored in the memory device(s) to interpret the camera output signal 1302 and initiate necessary control instructions to control operation of the hoist. For example, the control/processing board can provide instructions or commands to the winch to stop when abnormal winding conditions are detected on the drum by sensing mis-positioned cable wraps. Abnormal conditions may include a skipped groove (e.g., a gap between adjacent windings on the drum), overlapped windings (e.g., a step change in the diameter of the cable wrappings), or cable slack (e.g., non-uniformity in adjacent cable wrappings).

Digital input data stored in the memory device(s) may include drum surface configuration and cable configuration. The control programs or algorithms can compare the camera output signal from computer vision camera over time as cable is wrapped around the drum and "count" the number of cable wraps on the drum as well as the rate at which wraps are being added or removed. From this the control programs or algorithms of the processing system can compute the amount of cable on the drum as well as the rate at which cable is being spooled onto or unspooled from the drum. Determining cable loading or removal amounts or rates by the cable wrap monitoring system may replace other methods of monitoring cable movement, such as drum rotation sensors or motor operation encoding, or may be used for redundant measurement thereby improving reliability of the overall motion control system by reducing or eliminating single points of failure in the winch operational monitoring system.

Figure 3:
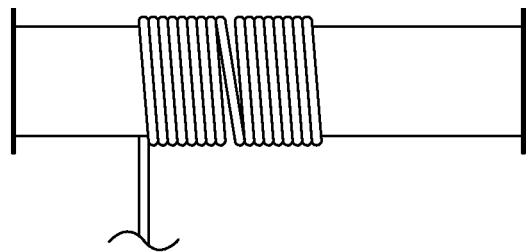
FIG. 3 illustrates a skipped groove cable condition on a winch drum.
Figure 4:
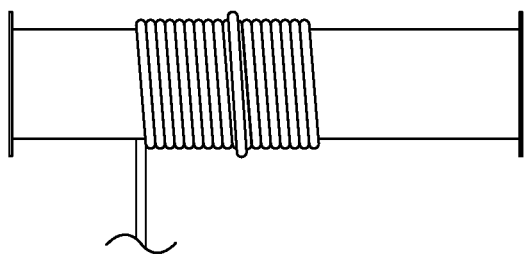
FIG. 4 illustrates an overlapped cable condition on a winch drum.
Figure 5:
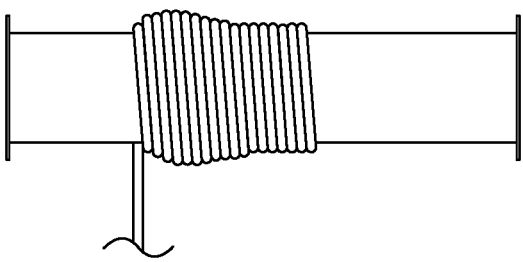
FIG. 5 illustrates a slack cable condition on a winch drum.

By comparing an input of desired cable wrapping in which each successive winding is located adjacent to the preceding winding on the drum, the processing system may also determine from the image signal from the computer vision camera that abnormal winding conditions exist on the drum by sensing mis-positioned cable wraps. Such abnormal conditions may include a skipped groove (e.g., a gap between adjacent windings) illustrated in FIG. 3, overlapping windings (e.g., a step change in the diameter of the cable wrappings) illustrated in FIG. 4, or cable slack (e.g., non-uniformity in adjacent cable wrappings) illustrated in FIG. 5. Any of these conditions can adversely affect motion of the supported load 200 being managed by the motion control system. Upon detection of an abnormal cable winding condition, the processing system may initiate and communicate an alarm signal to the motion control system so that a winch stop signal may be initiated to prevent uncontrolled or unanticipated movement of suspended load 200, injury to persons, or equipment damage.

The winch processing system 136 can, directly or indirectly, receive control instructions from motion control system 120 via a winch input control link 1202 and send information and requests to the automation controller or control system 120 using winch output control link 1204.

The control program or algorithm executed by the control/processing board may be integrated with other control programs or algorithms to provide the necessary control instructions to control normal operation of the components of the winch 102, such as to extend or retract cable or to control the speed at which the cable is extended or retracted. In addition, the control/processing board can receive signals, instructions and/or information from the motion control system 120 and/or the other control/processing boards of the other winches and then can generate the appropriate response instructions or commands for the winch 102 based on the received input to provide for smooth operation of the load supporting and motion system.

The computer vision camera field of vision 132 may be configured to view the entirety of the winch drum so that operating conditions may be observes regardless of the number of cable wraps stored on the drum. Sensing the entire drum 106 using a single sensor is advantageous over conventional contact-type sensors which may have limited monitoring ranges of the drum and may require periodic adjustment to initial operating conditions (e.g., number of cable wraps stored on the drum at a given reference location) for proper sensing function. Multiple computer vision cameras may be utilized in the system to provide redundancy, expand the field of view for longer drums, or to improve resolution in the detection of the cable on the drum. Other discreet purpose sensors needed to detect other abnormal conditions may also be replaced by the computer vision camera providing similar benefits in equipment set-up, calibration, and elimination of complex sensor systems necessary to effectively monitor multiple aspects of winch operation.

Accordingly, the invention advantageously reduces the cost of safety sensors required to monitor winch assemblies. A simplified winch drum monitoring system based on visual sensing may also reduce failure rates and false trips associated with known mechanical sensing solutions. Replacing mechanical sensing solutions with a computer vision sensing system should also reduce the user operational costs service visits, replacement parts, and labor necessary to maintain systems reliant upon mechanical sensing solutions.

Figure 2:
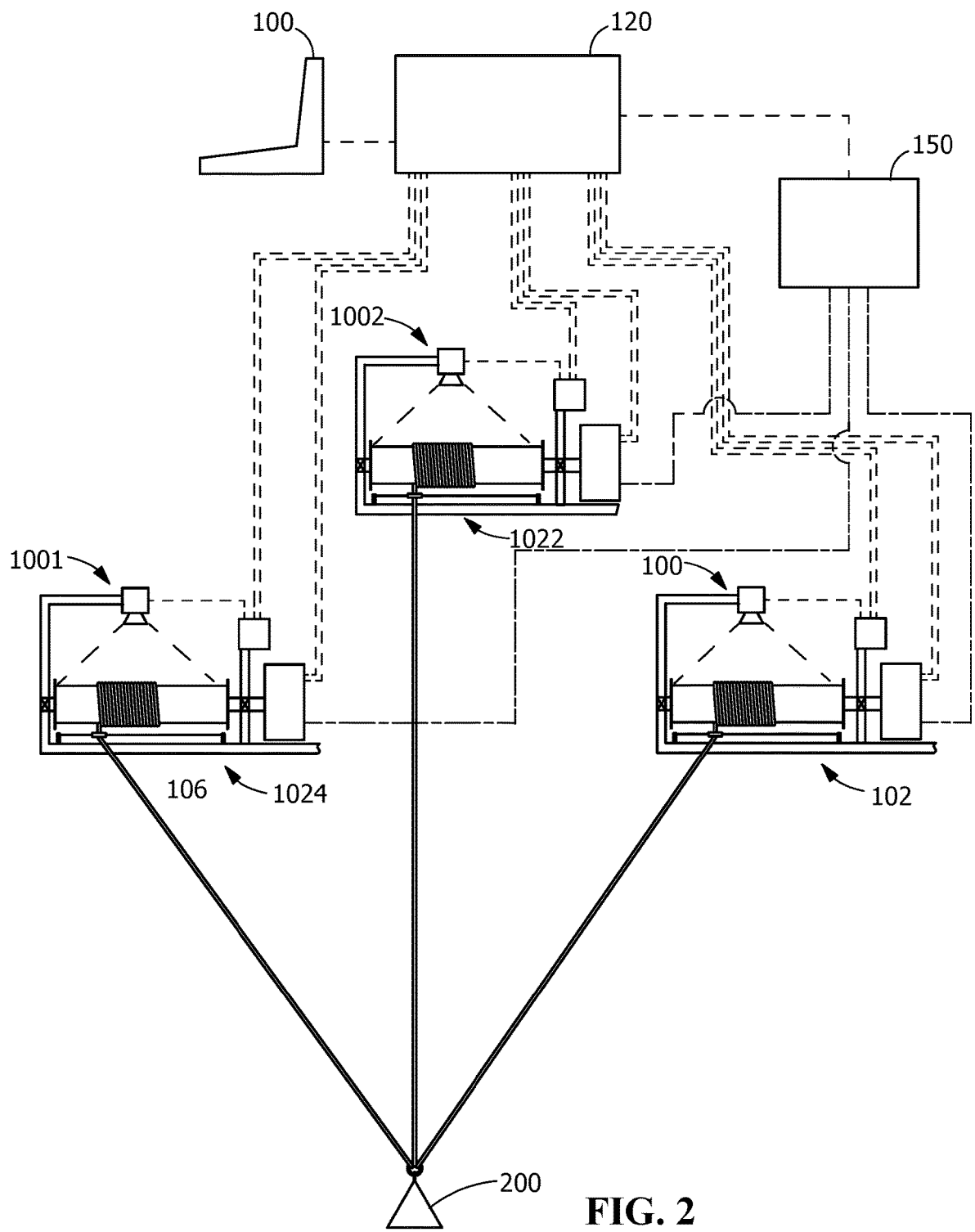
FIG. 2 is a diagram of an integrated load control system employing a plurality of winches utilizing a computer vision cable wrap sensor system.

Referring to FIG. 2, motion control system 120 may also manage operation of multiple other winch assemblies and equipment, such as to animate motion of a supported object in a three-dimensional space, by selectively deploying or retracting cables in a coordinated manner. A minimum of three winch assemblies are necessary to control load motion in three-dimensional space. Additional load motions such as pitch, roll, and yaw may also be controlled by further increasing the number of winch assemblies supporting the load and selective cable deployment or retraction in a coordinated manner. An exemplar motion control system for managing a plurality of winch assemblies in a coordinated to control motion of a supported load is disclosed in U.S. Pat. No. 8,909,379 to Fisher, the descriptive portions therein being incorporated by reference herein.

The motion control system 120 can include one or more microprocessors to execute one or more control programs or algorithms associated with control of a plurality of winch assemblies 1022, 1024, including winch assembly 102. The motion control system 120 can communicate with the plurality of winch assemblies 102, 1022, 1024 as described for a single winch assembly above, or other components using any suitable communication protocol such as 0-10 V (volt), modbus, profibus, artnet, BMS, ether cat, DMX, Ma-Net, K-Bus, serial, Ethernet, TCP and/or UDP. The motion control system 120 can provide basic system-wide instructions applicable to each winch assembly individually, e.g., a start or execute command or emergency stop (estop) command, using communication lines 1202 for each winch assembly. The motion control system 120 can also provide control instructions to an individual winch assembly based on the executed control program or based on a specific operator input into HMI 125. In addition, the motion control system 120 can receive information from the plurality of winch assemblies 102, 1022, 1024, including their respective cable wrap monitoring systems 100, 1002, 1001 regarding the operation of the winches via respective winch input and output control links and can provide the winch operational information to the operator through the HMI 125.

The motion control system 120 may provide an output control signal to an individual winch assembly experiencing abnormal operational conditions to suspend winch operation until the abnormal condition can be remedied. Alternatively, the motion control system may issue command instructions to the individual winch assembly experiencing an abnormal condition to direct winch operation intended to resolve the abnormal condition. The output control signal may stop movement of the problematic winch assembly 102 or direct movement to resolve the abnormal operation condition (e.g., briefly reverse drum movement to clear a skipped wrap). The motion control system 120 may also adjust operation of any other functional winch assemblies 1022, 1024 under its control to bring the suspended load 200 to a safe position pending restoration of the problematic winch assembly 102 to service or to minimize adverse impact on the supported load resulting from the loss of one winch such as to reposition the supported load to a location at which it will not interfere with operation of other animated loads that may be controlled by the motion control system.

While only certain features and embodiments of the invention have been shown and described, many modifications and changes may occur to those skilled in the art (for example, variations in sizes, dimensions, structures, shapes and proportions of the various elements, values of parameters (for example, temperatures, pressures, etc.), mounting arrangements, use of materials, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A system for monitoring cable winding and unwinding on a winch drum of a winch assembly, the winch assembly being one of a plurality of winch assemblies operably connected to a motion control system for suspending a load and animating flight thereof in a three-dimensional space, the system comprising:
    a computer vision sensor having a field of view in which the winch drum is positioned, the computer vision sensor configured to capture an image of the winch drum and output a digitized signal representative of the image;
    a processing system configured to receive the digitized signal representative of the image, analyze the digitized signal and compare the image represented by the digitized signal to one or more image parameters indicative of one or more detected winch operation conditions, and initiate a winch operation output signal indicative of the one or more detected winch operation conditions; and
    the motion control system configured to receive the winch operation output signal from the processing system and initiate a motor control output signal responsive to the one or more detected winch operation conditions, wherein the motor control output signal is a plurality of coordinated motor control output signals directed respectively to each winch assembly in a plurality of hoists;
    wherein the one or more detected winch operation conditions includes one or more of the following:
    a number of cable winding wraps on the winch drum, a rate of change in the number of cable winding wraps on the winch drum, whether the number of cable winding wraps on the winch drum is increasing or decreasing, a cable cross groove wrap on the winch drum, a cable skipped groove wrap on the winch drum, and cable slack on the winch drum.

2. The system of claim 1, wherein the motor control output signal includes a stop signal to stop drum movement.

3. The system of claim 1, the plurality of coordinated motor control output signals configured to adjust animated flight of the load to a safe condition.

4. The system of claim 1, wherein the one or more detected winch operation conditions includes a length of cable winding onto or off of the winch drum.

5. A method for monitoring cable winding and unwinding on a winch drum of a winch assembly, the winch assembly being one of a plurality of winch assemblies, comprising the steps of:
    providing a computer vision sensor having a field of view in which the winch drum is positioned;
    configuring the computer vision sensor to capture an image of the winch drum and output a digitized signal representative of the image;
    providing a processing system to receive the digitized signal, analyze the digitized signal, and compare the image represented by the digitized signal to one or more parameters indicative of one or more detected winch operation conditions, the one or more detected winch operation conditions including at least a cable cross groove wrap on the winch drum, a cable skipped groove wrap on the winch drum, and cable slack on the winch drum, and initiate a winch operation output signal indicative of the one or more detected winch operation conditions;
    providing a motion control system to receive the winch operation output signal from the processing system and initiate a motor control output signal responsive to the one or more detected winch operation conditions, wherein the motor control output signal is a plurality of coordinated motor control output signals directed respectively to each winch assembly in a plurality of hoists; and
    communicating by the processing system the winch operation output signal to the winch assembly.

6. The method of claim 5, wherein the one or more detected winch operation conditions includes a length of cable winding onto or off of the winch drum.

7. The method of claim 6, further comprising the steps of:
    providing the motion control system configured to manage operation of a plurality of winch assemblies, including an abnormal winch assembly, to control position and movement of a supported load by coordinated control of the plurality of winch assemblies; and
    initiating by the motion control system a plurality of winch control output signals, one for each winch assembly in the plurality of winch assemblies, to control motion of the supported load with the plurality of winch assemblies excluding the abnormal winch assembly.

8. The method of claim 7, further comprising the steps of:
    providing a human-machine interface (HMI) apparatus to receive winch assembly input parameter information, including at least drum diameter, cable wrap helical spacing, and cable characteristics, for the plurality of winch assemblies, and transmit the winch assembly input parameter information to the motion control system; and
    communicating by the motion control system the input parameter information to the respective processing systems for the plurality of winch assemblies, the processing systems computing winch assembly operating status using the input parameter information and the image output signal.

9. A system for monitoring cable winding and unwinding on a motor-driven winch drum of a winch assembly, the winch assembly being one of a plurality of winch assemblies, the system comprising:
    a computer vision sensor having a field of view in which the motor-driven winch drum is positioned, the computer vision sensor configured to generate an output signal representative of an image of the field of view;
    a processing system configured to receive the output signal, analyze and compare the image represented by the output signal to one or more image parameters indicative of one or more detected winch operation conditions, and initiate a winch operation output signal indicative of the one or more detected winch operation conditions; and a motion control system configured to receive the winch operation output signal from the processing system and initiate a motor control output signal responsive to the one or more detected winch operation conditions, wherein the motor control output signal is a plurality of coordinated motor control output signals directed respectively to each winch assembly in a plurality of hoists.

10. The system of claim 9, wherein the one or more detected winch operation conditions includes a number of cable wraps on the motor-driven winch drum, cross groove cable winding on the motor-driven winch drum, skipped groove cable winding on the motor-driven winch drum, and cable slack on the motor-driven winch drum.

11. The system of claim 9, wherein the one or more detected winch operation conditions includes a number of cable wraps on the motor-driven winch drum, rate of change in the number of cable wraps on the motor-driven winch drum, and whether the number of cable wraps on the motor-driven winch drum is increasing or decreasing.

12. The system of claim 11, wherein the one or more detected winch operation conditions includes a length of cable winding onto or off of the motor-driven winch drum.

13. The system of claim 9, wherein the motor control output signal includes a stop signal to stop drum movement.

14. The system of claim 13, further comprising at least a second motor driven winch assembly operationally controlled by the motion control system receives the stop signal and adjusts operation of the second motor driven winch assembly to move a load suspended by the winches and controlled by the motion control system to a safe condition.

\* \* \* \* \*